United States Patent
Chino et al.

(10) Patent No.: US 7,739,868 B2
(45) Date of Patent: Jun. 22, 2010

(54) DETERIORATION DIAGNOSTIC SYSTEM OF EXHAUST GAS PURIFYING CATALYST

(75) Inventors: Daisuke Chino, Okazaki (JP); Kenji Saito, Nagoya (JP); Hitoshi Kamura, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 635 days.

(21) Appl. No.: 11/797,864

(22) Filed: May 8, 2007

(65) Prior Publication Data
US 2007/0261390 A1 Nov. 15, 2007

(30) Foreign Application Priority Data
May 9, 2006 (JP) ............... P2006-129813

(51) Int. Cl.
*F01N 3/00* (2006.01)
(52) U.S. Cl. ............... 60/277; 60/274; 60/285
(58) Field of Classification Search ........... 60/276, 60/277, 285
See application file for complete search history.

(56) References Cited

U.S. PATENT DOCUMENTS 5,732,552 A * 3/1998 Matsumoto et al. ........... 60/276

2006/0137326 A1 * 6/2006 Saito et al. ............... 60/277

FOREIGN PATENT DOCUMENTS

JP 8-218853 A 8/1996

* cited by examiner

*Primary Examiner*—Thomas E. Denion
*Assistant Examiner*—Audrey Klasterka
(74) *Attorney, Agent, or Firm*—Birch, Stewart, Kolasch & Birch, LLP

(57) ABSTRACT

A deterioration diagnostic system of an exhaust gas purifying catalyst includes: an upstream side switching frequency calculator calculating the number of times of switching on the upstream side; a reference value calculator calculating a downstream side rich/lean determination level having a first width; a downstream side rich/lean determination level adjuster setting the first width to a second larger width when the number of times of switching on the upstream side is smaller than a predetermined value; a downstream side switching frequency calculator calculating the number of times of switching on the downstream side; a frequency ratio calculator calculating a frequency ratio between the number of times of switching on the downstream side and the number of times of switching on the upstream side; and a deterioration determiner determining the deterioration of the exhaust gas purifying catalyst when the frequency ratio is larger than a predetermined value.

7 Claims, 9 Drawing Sheets

DETERIORATION DIAGNOSTIC SYSTEM OF EXHAUST GAS PURIFYING CATALYST

BACKGROUND OF THE INVENTION

The present invention relates to a deterioration diagnostic system of an exhaust gas purifying catalyst and more particularly to a diagnostic system including upstream and downstream air-fuel ratio sensors which are provided on an upstream side and a downstream side of an exhaust gas purifying catalyst.

An oxidization-reduction type exhaust gas purifying catalyst (hereinafter, referred to as a three-way catalyst) is provided in an exhaust system of an automotive gasoline engine (internal combustion engine) for decreasing harmful substances contained in exhaust gases.

In this three-way catalyst, while a chemical reaction of oxidizing the harmful substances such as hydrocarbons (HC) and carbon monoxide (CO) occurs, a chemical reaction of reducing oxides of nitrogen (NOx) occurs, whereby exhaust gases are purified.

Air-fuel ratio sensors (oxygen sensors) are provided on an upstream side and a downstream side of the three-way catalyst, respectively, and the deterioration of the three-way catalyst is diagnosed based on output signals from these oxygen sensors (refer, for example, to JP-A-8-218853.).

In a deterioration diagnostic system of an exhaust gas purifying catalyst which is described in JP-A-8-218853, a hysteresis constant $\alpha$ is added to or subtracted from a mean value VORave calculated based on an output voltage VOR of the downstream $O_2$ sensor to calculate upper and lower inversion or switch thresholds THH, THL, and a downstream side switch frequency fR is calculated from the number of times the output voltage VOR crosses the switch thresholds THH, THL, while an upstream side switch frequency fF is calculated from the number of times an output voltage VOF of the upstream $O_2$ sensor crosses its threshold VTH. Then, a switch frequency ratio fR/fF is calculated from the upstream side switch frequency fF and the downstream side switch frequency, and it is determined that the three-way catalyst is deteriorating in the event that the switch frequency ratio fR/fF is in excess of a predetermined value THc.

In the above-mentioned deterioration diagnostic system of the exhaust gas purifying catalyst, it is possible to detect the deterioration of the catalyst, however, it is difficult to determine the deterioration of the catalyst with high accuracy.

Namely, in the deterioration diagnostic system of the exhaust gas purifying catalyst which is described in JP-A-8-218853, when the accuracy with which the deterioration of the catalyst is determined is increased by setting small the upper and lower switch thresholds THH, THL so as to make them close to the mean value VORave, the correction amount of air-fuel ratio and feedback becomes excessive as the accuracy so increases due to the deterioration of the upstream $O_2$ sensor even in the event that the catalyst is not deteriorated. Since this increases the amplitude of the air-fuel ratio and causes the output signals from the upstream and downstream $O_2$ sensors to synchronize to thereby increase the switch frequency ratio fR/fF, there has been a possibility that it is erroneously determined that the catalyst is deteriorating. In particular, in the event that the intake air volume is large, the exhaust gas purifying reaction time in the catalyst becomes short and this makes it difficult to absorb the amplitude of the air-fuel ratio, whereby the risk that the erroneous determination is made becomes high.

SUMMARY

It is therefore an object of the invention to provide a deterioration diagnostic system of an exhaust gas purifying catalyst, which can prevent the erroneous determination of the deterioration of the catalyst due to the deterioration of the upstream oxygen sensor so as to determine the deterioration of the relevant catalyst with high accuracy.

In order to achieve the object, according to the invention, there is provided a deterioration diagnostic system of an exhaust gas purifying catalyst provided in an exhaust passageway of an internal combustion engine, which is operable to diagnose deterioration of the exhaust gas purifying catalyst based on output signals of upstream and downstream air-fuel ratio sensors which are provided on an upstream side and a downstream side of the exhaust gas purifying catalyst, the deterioration diagnostic system comprising:

an upstream side switching frequency calculator, operable to calculate the number of times of switching on the upstream side from a rich side to a lean side or from the lean side to the rich side based on the output signals of the upstream air-fuel ratio sensor and an upstream side rich/lean determination level;

a reference value calculator, operable to calculate a downstream side rich/lean determination level having a first width which is used for performing a downstream side rich/lean determination;

a downstream side rich/lean determination level adjuster, operable to set the first width of the downstream side rich/lean determination level to a second width that is larger than the first width when the number of times of switching on the upstream side is smaller than a first predetermined value;

a downstream side switching frequency calculator, operable to calculate the number of times of switching on the downstream side from the rich side to the lean side or from the lean side to the rich side based on the output signals of the downstream side air-fuel ratio sensor and the downstream side rich/lean determination level having the second width;

an intake air volume calculator, operable to calculate an intake air volume into the internal combustion engine;

a frequency ratio calculator, operable to calculate a frequency ratio that is a ratio between the number of times of switching on the downstream side and the number of times of switching on the upstream side when the intake air volume is no less than a predetermined lower limit value and is no more than a predetermined upper limit value; and a deterioration determiner, operable to determine the deterioration of the exhaust gas purifying catalyst when the frequency ratio is larger than a second predetermined value.

DETAIL DESCRIPTION OF PREFERRED EMBODIMENTS

Hereinafter, a best mode for carrying out a deterioration diagnostic system of an exhaust gas purifying catalyst according to the invention will be described based upon an embodiment.

Figure 3:
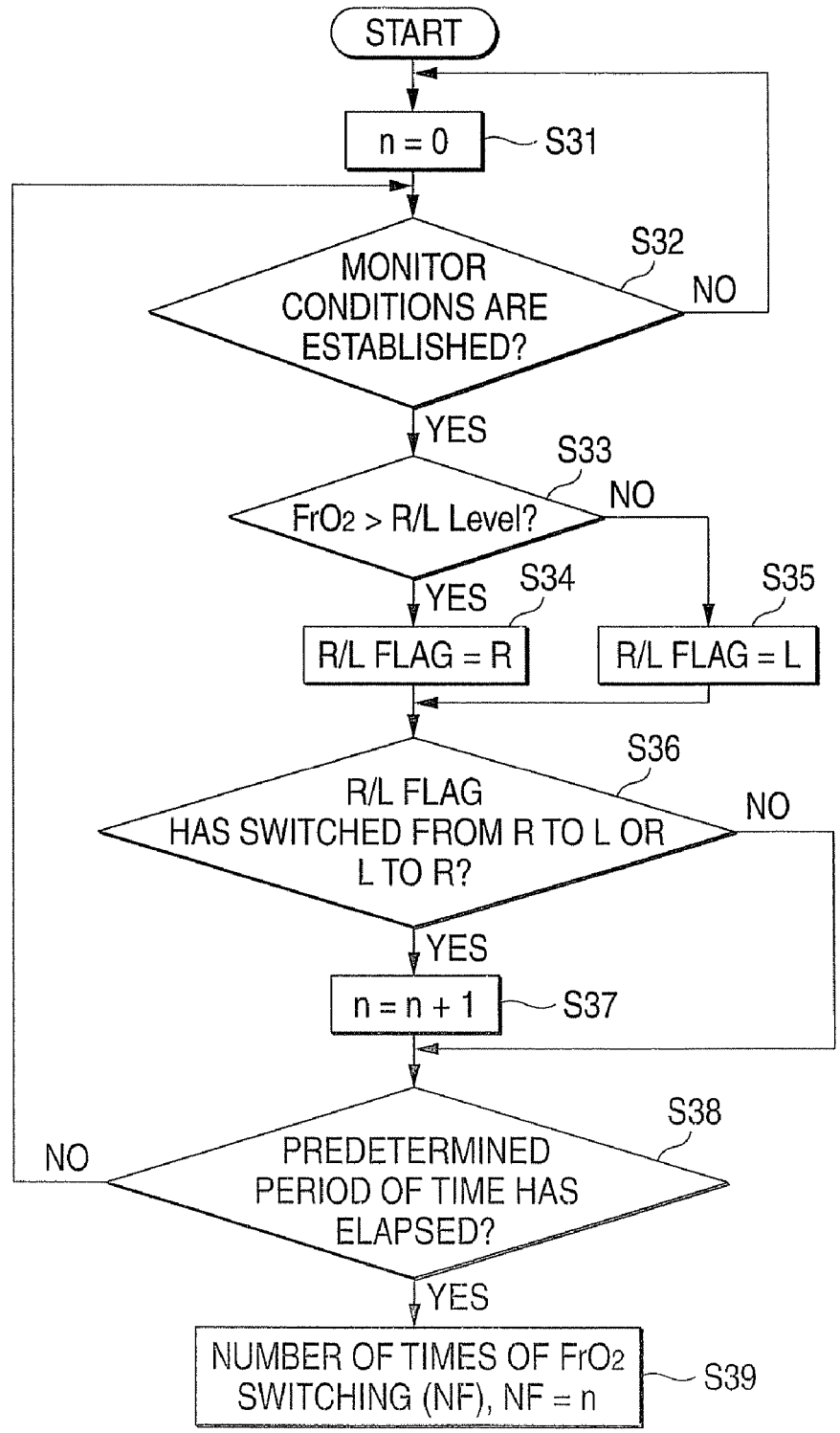
FIG. 3 is a flowchart illustrating a detailed procedure of a step of calculating the number of times $FrO_2$ switches in the flowchart shown in FIG. 2.
Figure 4:
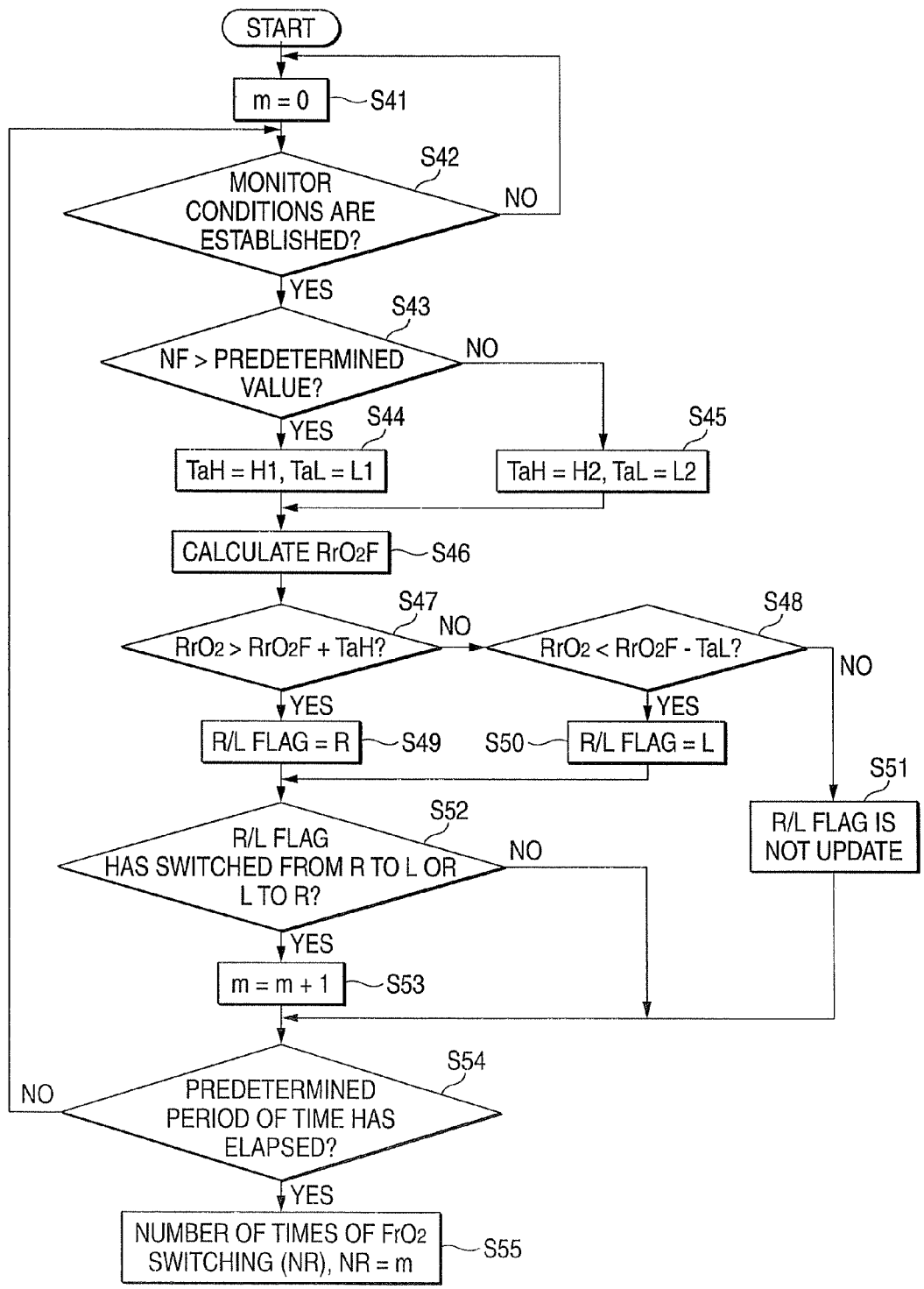
FIG. 4 is a flowchart illustrating a detailed procedure of a step of calculating the number of times $RrO_2$ switches in the flowchart shown in FIG. 2.

Hereinafter, a deterioration diagnostic system of an exhaust gas purifying catalyst according to an embodiment of the invention will be described based on the drawings. In FIG. 3, R/L Level denotes an upstream side rich/lean determination level, R/L flag a rich/lean determination flag, R rich, and L lean. In FIG. 4, TaH denotes an upper limit value (on a rich side) of a downstream side rich/lean determination level, TaL a lower limit value (on a lean side) of the downstream side rich/lean determination level, and $RrO_2F$ a downstream side rich/lean determination level reference value.

The deterioration diagnostic system according to the embodiment of the invention is provided in an ECU 50 which is an electronic control unit of an engine which controls an engine 11 which is an internal combustion engine.

The engine 11 is a spark ignition gasoline engine and in the engine 11, a cylinder head 13 is fastened on to a cylinder block 12. A plurality of pistons are fitted and arranged in series in this cylinder block 13 in such a manner as to reciprocate freely in vertical directions. A crankshaft 15 is rotatably supported in a lower portion of the cylinder block 12, and this crankshaft 15 and the respective pistons 14 are connected by a connecting rod 16.

A plurality of combustion chambers 17 include the cylinder block 12, the cylinder head 13 and the respective pistons 14, and an intake port 18 and an exhaust port 19 are provided on sides of each combustion chamber 17, respectively, in such a manner as to communicate with the combustion chamber 17. Distal ends of an intake valve 20 and an exhaust valve 21 face each of the intake ports 18 and each of the exhaust ports 19, respectively, so that the communication of the combustion chamber 17 with the respective ports 18, 19 is established and cut off by these valves. An intake pipe 23 is connected to the intake port 18 via an intake manifold 22, while an exhaust pipe 25 is connected to the exhaust port 19 via an exhaust manifold 24.

A fuel injection valve 26 is mounted in each intake pipe 23 for each cylinder, and spark plugs 27 are mounted on the cylinder head 13.

The spark plugs 27 are connected to the ECU 50 via ignition coils 28. A high voltage is outputted to the spark plug 27 by the ignition coil 28.

Mounted on the engine 11 are a crank angle sensor 29 for detecting the number of revolutions of an output shaft (an output shaft revolution speed) Ne and the like and a coolant temperature sensor 30 for detecting a coolant temperature TW.

A surge tank 31 is provided in an intermediate portion along the length of the intake pipe 23. An air cleaner 32, a Karman vortex air flow sensor 33, an electronically controlled throttle valve 34 and an ISC (idle speed controller) 35, which are located upstream of the intake pipe 23, are connected to the intake pipe 23.

A throttle position sensor 36 for detecting the opening or position θTH of the electronically controlled throttle valve 34, an atmospheric pressure sensor 37 for detecting the atmospheric pressure Ta and an intake air temperature sensor 38 for detecting the temperature Ta of intake gas are connected to the intake system.

A three-way catalyst 39, which is situated downstream of the exhaust pipe 25, is connected to the exhaust system. Upstream and downstream $O_2$ sensors (air-fuel ratio sensors) 40, 41 are provided on an upstream side and a downstream side of the three-way catalyst 39, respectively. These $O_2$ sensors react to oxygen contained in exhaust gases which are about to enter the tree-way catalyst 39 and oxygen contained in exhaust gases which have just passed through the relevant catalyst 39, respectively, to thereby generate voltages according to the concentration of oxygen in the respective gases.

On the other hand, the ECU 50, which is placed inside a passenger compartment, includes an input/output device, not shown, storage devices (ROM, RAM, nonvolatile RAM and the like) which incorporate a number of control programs, a central processing unit (CPU), a timer counter and the like. The crank angle sensor 29, the coolant temperature sensor 30, the Karman vortex air flow sensor 33, the atmospheric pressure sensor 37, the intake air temperature sensor 38, the $O_2$ sensors 40, 41 and the like are connected to an input side of the ECU 50.

In addition, the fuel injection valves 26, the ignition coils 28, the ISC 35 and the like are connected to an output side of the ECU 50, and optimal values which are calculated based on input information from the various sensors are outputted to those output side connected devices. Furthermore, the ECU 50 controls fuel injection and ignition timings and the ISC 35 and also determines the deterioration of the three-way catalyst 39 based on output signals from the $O_2$ sensors 40, 41. A warning light or malfunction indicating light (MIL) 42 is placed inside the passenger compartment, and when the ECU 50 determines that the three-way catalyst 39 is deteriorating, the malfunction indicating light 42 is illuminated to notify the driver of the deterioration of the catalyst 39.

Firstly, a fuel injection control of the embodiment will be described. A fuel injection control is executed by the ECU 50 at the same time that the driver starts the engine 11. When starting this control, the ECU 50 obtains intake air volume information A/N for each induction stroke based on output signals of the air flow sensor 33 and the crank angle sensor 29 and then calculates a basic fuel injection time TBASE from the value of intake air volume information so obtained and a target air-fuel ratio (generally, a theoretic air-fuel ratio)

Next, the ECU 50 corrects the basic fuel injection time TBASE based on output signals of the atmospheric pressure sensor 37 and the intake air temperature sensor 38 and also performs corrections for warming up the engine and accelerating the vehicle based on output signals of the coolant temperature sensor 30 and throttle position sensor 36 to thereby calculate a fuel injection time TINJ.

Then, the ECU 50 adds to the fuel injection time TJIN obtained in this way a reactive injection time TD which compensate for a delay in opening of the fuel injection valves 26 and thereafter drives the fuel injection valves 26 via fuel injection drivers, not shown.

Here, when predetermined driving conditions that the upstream $O_2$ 40 sensor is completely activated, the engine 11 is not in a high-load, high-speed driving condition and the like are met, the ECU 50 starts an air-fuel ratio feedback control in which magnitudes of an output voltage VOF of the upstream $O_2$ sensor 40 and a predetermined threshold VTH (for example, 0.5 V) are compared to each other, so as to feedback correct the air-fuel ratio.

Namely, since in the upstream $O_2$ sensor 40, the output voltage VOF switches abruptly from its maximum voltage (for example, 1.0 V) to its minimum voltage (for example, 0 V) at around where the air-fuel ratio of air-fuel mixture reaches the theoretic air-fuel ratio, when the output voltage VOF lowers below the threshold VTH (for example, 0.5 V), the fuel injection time is gradually extended so that the air-fuel mixture becomes rich, whereas when the output voltage VOF exceeds the threshold VTH, the fuel injection time is gradually shortened so that the air-fuel mixture becomes lean. As a result, the air-fuel ratio of the air-fuel mixture is held to stay in the vicinity of the theoretic air-fuel ratio at all times, the purification of exhaust gases by the three-way catalyst 39 is performed with high efficiency.

In the air-fuel ratio feedback control of this embodiment, a learning correction is performed so that a center value of the feedback control coefficient becomes 1.0, and the leaning correction amount is stored in a nonvolatile RAM. Then, by the use of the learning correction amount the accuracy of the aforesaid open-loop control is increased, and a deviation amount at the rise of the feedback control is made small.

Figure 5:
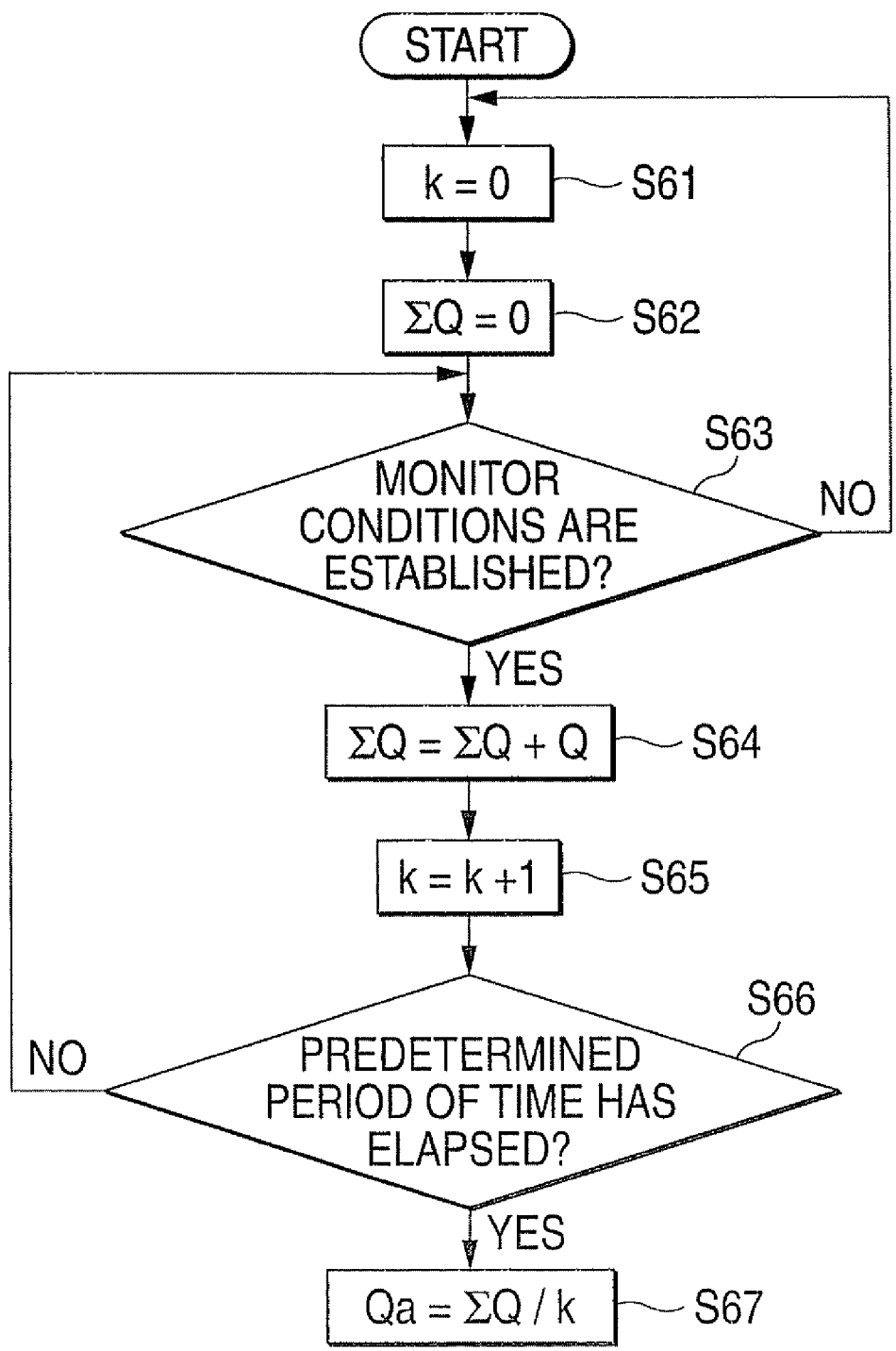
FIG. 5 is a flowchart illustrating a detailed procedure of an intake air volume calculation step in the flowchart shown in FIG. 2.
Figure 6:
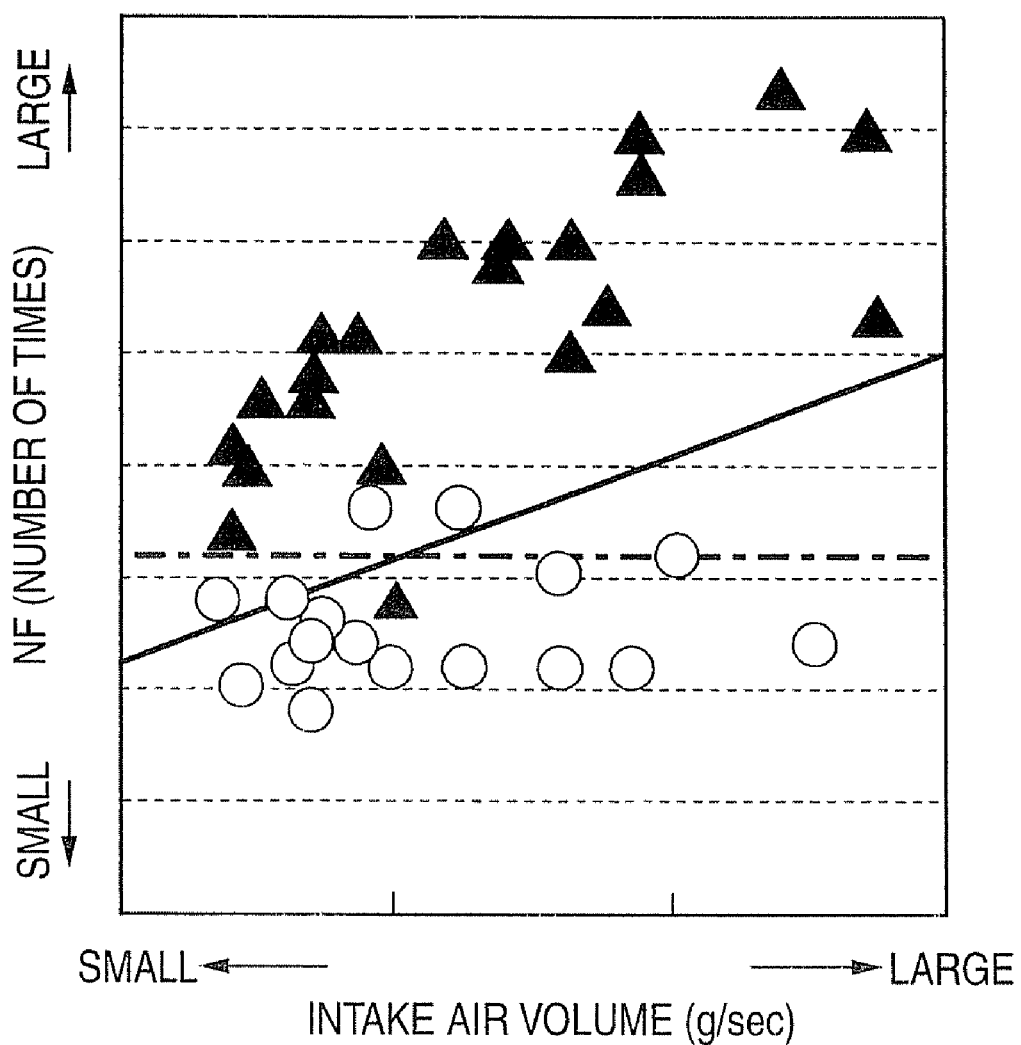
FIG. 6 is a graph showing a relationship between intake air volume and the number of times NF the $FrO_2$ switches in an upstream $O_2$ sensor possessed by the deterioration diagnostic system according to the embodiment of the invention.
Figure 7:
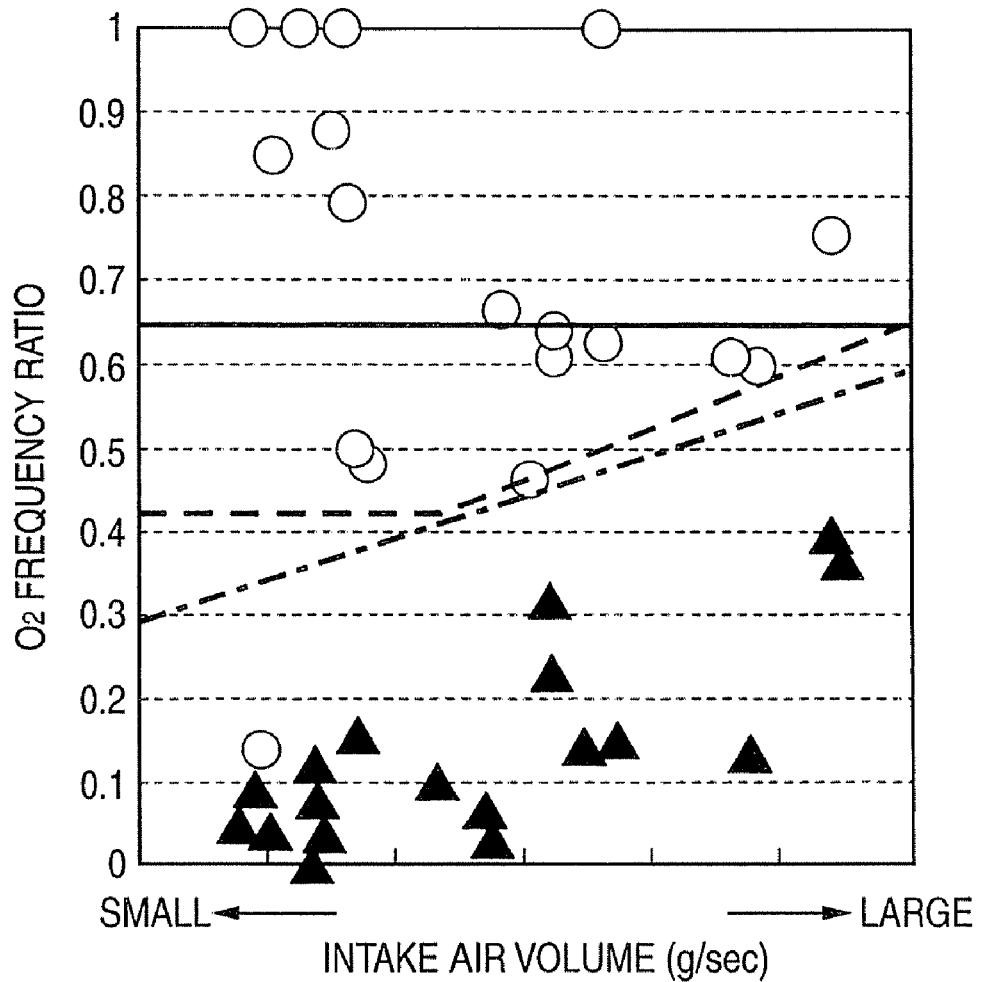
FIG. 7 is a graph showing a second frequency ratio determination criterion in FIG. 2.

Hereinafter, using flowcharts in FIGS. 2 to 5 and graphs in FIGS. 6 to 9, a diagnostic procedure of deterioration of a catalyst according to the embodiment will be described. Note that in FIGS. 4 and 8, H1 denotes an upper limit value (rich side) of a downstream side rich/lean determination level when the upstream $O_2$ sensor 40 is normal, L1 a lower limit value (lean side) of the downstream side rich/lean determination level when the upstream O2 sensor 40 is normal, H2 an upper limit value (rich side) of the downstream side rich/lean determination level when the upstream $O_2$ sensor 40 is deteriorating, and L2 a lower limit value (lean side) of the downstream side rich/lean determination level when the upstream O2 sensor 40 is deteriorating. In this way, the downstream side rich/lean determination level has a predetermined width. In FIG. 5, Q denotes an intake air volume. In FIG. 6, a black triangle denotes a point in time at which the upstream $O_2$ sensor 40 is normal, a white circle a point in time at which the upstream $O_2$ sensor 40 is deteriorating, and a solid line and an alternate long and short dash line denote values at which the three-way catalyst is determined deteriorating. In FIG. 9, a black triangle denotes a case where the downstream side rich/lean determination level is 0.1 V when the catalyst is normal while the upstream $O_2$ sensor 40 is deteriorating (the downstream rich/lean determination level when the upstream $O_2$ sensor 40 is normal), a white circle denotes a case where the downstream side rich/lean determination level is 0.2 V when the catalyst is normal while the upstream $O_2$ sensor 40 is deteriorating (the downstream rich/lean determination level when the upstream $O_2$ sensor 40 is deteriorating), and a dotted line denotes a deterioration determination value of the catalyst which varies according to the intake air volume.

When the driver switches on the ignition switch to start the engine 11, a catalyst deterioration diagnostic routine shown in FIGS. 2 to 5 is executed.

Figure 1:
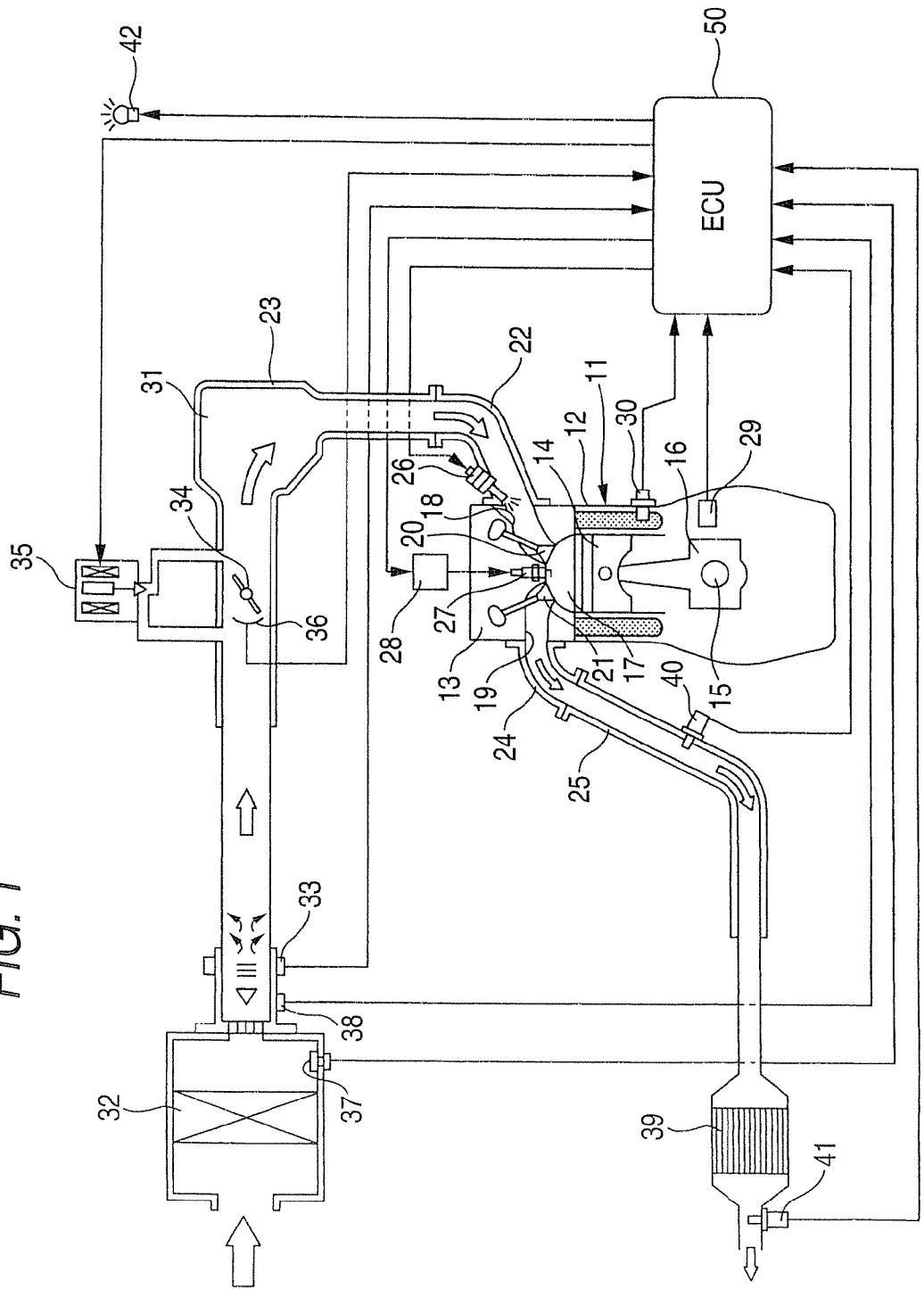
FIG. 1 is a drawing schematically showing the configuration of an internal combustion engine which has a deterioration diagnostic system of an exhaust gas purifying catalyst according to an embodiment of the invention.
Figure 2:
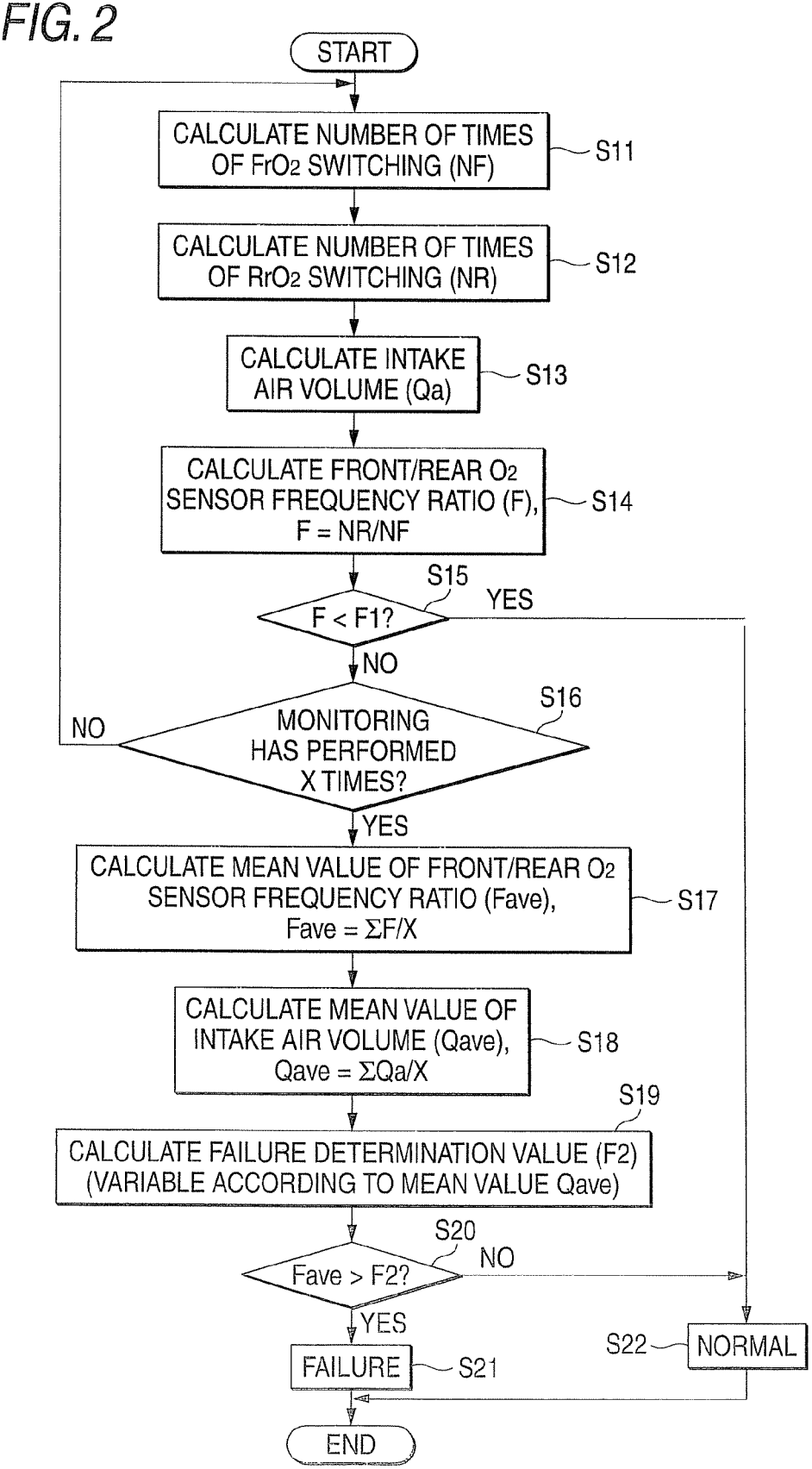
FIG. 2 is a flowchart illustrating a diagnostic procedure of catalyst deterioration in the deterioration diagnostic system according to the embodiment of the invention.

When this routine is initiated, the ECU 50 firstly calculates the number of times of switching on the upstream side NF where the voltage outputted from the upstream $O_2$ sensor 40 crosses a predetermined value in step S11 in FIG. 2.

Following this, proceeding to step S12, the ECU 50 calculates, in this step, the number of times of switching on the downstream side NF where the voltage outputted from the downstream $O_2$ sensor 41 based on a detected oxygen concentration exceeds or lowers below a predetermined range.

Following this, proceeding to step S13, the ECU 50 calculates, in this step, an intake air volume Qa based on an intake air volume detected by the air flow sensor 33 and the opening or position θTH of the electronically controlled throttle valve 34 detected by the throttle position sensor 36.

Following this, proceeding to step S14, the ECU 50 calculates, in this step, a front/rear $O_2$ sensor frequency ratio F based on the NF, NR which are calculated in step S11 and S12, respectively. Here, the frequency ratio F is calculated using an equation; F=NR/NF.

Following this, proceeding to step S15, the ECU 50 determines, in this step, that the three-way catalyst is normal. Namely, if the frequency ratio F is smaller than a primary predetermined frequency ratio F1 (deterioration determination predetermined value), the flow proceeds to step S22, whereas if the frequency ratio F is equal to or larger than the primary predetermined frequency ratio F1 (deterioration determination predetermined value), the flow proceeds to step S16. Here, as the primary predetermined frequency ratio F1, for example, 0.1 is raised.

In step S16, the number of times of monitoring is determined. Namely, if the number of times of monitoring is equal to a predetermined value X, the flow proceeds to step S17, whereas if the number of times of monitoring is smaller than the predetermined value X, the flow returns to step S11.

Following this, in step S17, the ECU 50 calculates a mean value Fave of the frequency ratio F. Namely, the mean value Fave of the frequency ratio is calculated by an equation; Fave =ΣF/X.

Following this, the flow proceeds to step S18. In this step, the ECU 50 calculates a mean value Qave of the intake air volume. Namely, the mean value Qave of the intake air volume is calculated by an equation; Qave=ΣQa/X.

Following this, the flow proceeds to step S19. In this step, the ECU 50 calculates a secondary frequency ratio F2 according to the mean value Qave of the intake air volume. Raised as the secondary frequency ratio F2 are a line which stays at a constant value until a predetermined intake air volume is reached and which increases in proportion to the intake air volume when the intake air volume becomes larger than the predetermined one and a line which increases in line with the intake air volume, such as lines indicated by a broken line and an alternate long and short dash line, respectively, in FIG. 7.

Following this, the flow proceeds to step S20, and in this step, the ECU 50 determines the failure of the three-way catalyst 39. Namely, if the mean value Fave of the frequency ratio is larger than the secondary frequency ratio F2, the flow proceeds to step S21, whereas if the mean value Fave is equal to or smaller than the secondary frequency ratio F2, the flow proceeds to step S22.

In step S21, the ECU 50 determines that the three-way catalyst 39 fails and ends the routine.

In step S22, the ECU 50 determines that the three-way catalyst 39 is normal and ends the routine.

Here, the step S11 will be described in detail using FIG. 3.

Firstly, in step S31, setting n=0, the flow proceeds to step S32.

In step S32, the ECU 50 determines monitor conditions, and if it determines that the monitor conditions are met, the flow proceeds to step S33, whereas if the ECU 50 determines that the monitor conditions are not established, the flow returns to step 31.

Here, raised as the monitor conditions are conditions that the air-fuel ratio feedback control is performed, the engine revolution speed Ne and the intake air volume Q reside within predetermined ranges, both the $O_2$ sensors 40, 41 operate normally, and the like.

Note that the reason the engine revolution speed Ne and the intake air volume Q are confirmed here to be within the predetermined ranges is that when these are instable, the $O_2$ concentration in exhaust gases is also instable, and this makes it impossible for a normal feedback control to be carried out, and therefore, as the monitor conditions, the engine revolution speed Ne and the intake air volume Q need to fall within ranges defined by the following equations (1), (2). In the following equations, Ne1, Ne2, Q1, and Q2 denotes thresholds, and their specific values are, for example, Ne1 is 1400 rpm, Ne2 3000 rmp, Q1 10 g/sec, and Q2 30 g/sec with the engine 1 connected to an automatic transmission.

$$Ne1 < Ne < Ne2 \quad (1)$$

$$Q1 < Q < Q2 \quad (2)$$

In step S33, whether or not the oxygen concentration (voltage) $FrO_2$ in the upstream $O_2$ sensor 40 exceeds an upstream side rich/lean determination level which is a predetermined value is determined. Namely, if the $FrO_2$ is larger than the upstream side rich/lean determination level, the flow proceeds to step S34, whereas if the $FrO_2$ is equal to the upstream side rich/lean determination level, or if the $FrO_2$ is smaller than the rich/lean determination level, the flow proceeds to step S35.

In step S34, an R/L flag is set to R, and the flow proceeds to step S36.

In step S35, the R/L flag is set to L, and the flow proceeds to step S36.

In step S36, whether or not the R/L flag has been switched is determined. Namely, if the R/L flag is determined to have been switched from R to L or L to R, the flow proceeds to step S37, whereas if the R/L flag is determined not to have been switched which constitutes a case other than the case above where the relevant flag has been switched in the way described, the flow proceeds to step S38.

In step S37, 1 is added to n, and then, the flow proceeds to step S38.

In step S38, whether or not a predetermined period of time has elapsed is determined. If it is determined that the predetermined period of time has elapsed, the flow proceeds to step S39, whereas if the predetermined period of time is determined not to have elapsed, the flow returns to step S32.

In step S39, the number of times of switching on the upstream side in the upstream $O_2$ sensor 40 is calculated. Namely, the number of times of switching NF is set to n.

Here, the step S12 will be described in detail using FIG. 4.

Firstly, in step S41, setting m=0, the flow proceeds to step S42.

In step S42, monitor conditions are determined, and if the monitor conditions are determined to be established, the flow proceeds to step 43, whereas if the monitor conditions are determined not to have been established, the flow returns to step S41. Note that the monitor conditions in this step are the same as the monitor conditions in step S32, and hence, the description thereof will be omitted here.

In step S43, whether the NF is larger than a predetermined value is determined. Namely, if the NF is larger than the predetermined value, the flow proceeds to step S44, whereas if the NF is equal to or smaller than the predetermined value, the flow proceeds to step S45. Note that the solid line and the alternate long and short dash line in FIG. 6 are raised as the predetermined value.

In step S44, a downstream side rich/lean determination level is set. Here, the downstream side rich/lean determination level is a predetermined hysteresis, and an upper limit value (rich side) TaH of the downstream side rich/lean determination level is set as H1 (for example, 0.1 V), while a lower limit value (lean side) Tal of the downstream side rich/lean determination value is set as L1, the flow proceeding to step S46.

In step S45, a downstream side rich/lean determination level is set. Namely, an upper limit value (rich side) TaH of the downstream side rich/lean determination level is set as H2 (>H1) (for example, 0.2 V), whereas a lower limit value (lean side) TaL of the downstream side rich/lean determination level is set as L2 (<L1), and the flow proceeds to step S46.

In step S46, a downstream side rich/lean determination level reference value $RrO_2F$ (a downstream $O_2$ sensor filter value) is calculated. Namely, the reference value $RrO_2F$ is calculated by averaging output signals of the downstream $O_2$ sensor 41.

Following this, proceeding to step S47, the ECU 50 determines in this step whether or not an output signal $RrO_2$ of the downstream $O_2$ sensor 41 exceeds the upper limit (rich side) of the downstream side rich/lean determination level. Namely, if the $RrO_2$ is larger than a sum of the reference value. $RrO_2F$ and the upper limit value (rich side) TaH of the downstream side rich/lean determination level, the flow proceeds to step S49, whereas if the $RrO_2$ is equal to or smaller than the sum of the reference value $RrO_2$ and the TaH, the flow proceeds to step S48.

In step S48, the ECU 50 determines whether or not the output signal $RrO_2$ of the downstream $O_2$ sensor exceeds the lower limit value (lean side) of the downstream side rich/lean determination level. Namely, if the $RrO_2$ is smaller than a difference between the reference value $RrO_2F$ and the lower limit value (lean side) TaL of the downstream side rich/lean determination level, the flow proceeds to step S50, whereas if the $RrO_2$ is equal to or larger than the difference between the reference value $RrO_2F$ and the TaL, the flow proceeds to step S51.

In step S49, a rich/lean switch flag (R/L flag) is set to rich R, and the flow proceeds to S52.

In step S50, the R/L flag is set to lean L, and the flow proceeds to step S52.

In step S51, the R/L flag is not updated, and the flow proceeds to step S54.

In step S52, whether or not the R/L flag has been switched is determined. Namely, if the R/L flag is determined to have been switched from R to L or L to R, the flow proceeds to step S53, whereas if the R/L flag is determined not to have been switched which constitutes a case other than the case above where the relevant flag has been switched in the way described, the flow proceeds to step S54.

In step S53, 1 is added to m, and the flow proceeds to step S54.

In step S54, whether or not a predetermined period of time has elapsed is determined. If the predetermined period of time is determined to have elapsed, the flow proceeds to step S55, whereas if the predetermined period of time is determined not to have elapsed, the flow returns to step S42.

In step S55, the number of times of switching NR on the downstream side in the downstream $O_2$ sensor 41 is calculated. Namely, the number of times of switching NR is set to m.

Here, the step S13 will be described in detail using FIG. 5.

Firstly, in step S61, setting k=0, the flow proceeds to step S62.

In step S62, setting a total sum of intake air volumes as $\Sigma Q=0$, the flow proceeds to step S63.

In step S63, monitor conditions are determined, and if the monitor conditions are determined to have been established, the flow proceeds to step S64, whereas if the conditions are determined not to have been established, then, the flow returns to step S61. Note that the monitor conditions in this step are the same as the monitor conditions in step S32, and therefore, the description thereof will be omitted here.

In step S64, the current intake air volume Q is added to the total sum $\Sigma Q$ of intake air volumes.

Following this, proceeding to step S65, 1 is added to k in this step, and the flow proceeds to step 66.

In step S66, whether or a predetermined period of time has elapsed is determined. If the predetermined period of time is determined to have elapsed, the flow proceeds to step S67, whereas the predetermined period of time is determined not to have elapsed, the flow returns to step S63.

In step S67, a mean intake air volume Qa is calculated. Namely, the mean intake air volume Qa is calculated by Qa=$\Sigma Q$/k.

In addition, if determining that the three-way catalyst 39 is deteriorating, the ECU 50 stores a failure code for the failure of the catalyst in a RAM, whereby when repairing the catalyst, a mechanic can easily get information on the details of the failure by reading out the failure code, so that a countermeasure against the failure such as a replacement of three-way catalysts 39 can easily be taken.

Namely, the ECU 50 includes the upstream side switching frequency calculation device for calculating the number of times NF of switching from the rich side to the lean side or the lean side to the rich side on the upstream side based on the output signal $FrO_2$ of the upstream $O_2$ sensor 40 and the upstream side rich/lean determination level, the reference value calculating device for calculating the downstream side rich/lean determination level reference value $RrO_2F$ obtained by averaging output signals RrO2 of the downstream $O_2$ sensor 41 and the downstream side rich/lean determination level having the predetermined width for performing a downstream side rich/lean determination, the downstream side rich/lean determination level adjusting device for setting the downstream side rich/lean determination level large in the event that the number of times NF of switching on the upstream side lowers below the predetermined value, the downstream side rich/lean determination level calculating device provided in the reference value calculating device for calculating the downstream side rich/lean determination level (rich side) by adding the downstream side rich/lean determination level to the reference value $RrO_2$ and calculating the downstream side rich/lean determination level (lean side) by subtracting the downstream side rich/lean determination level from the reference value $RrO_2F$, the downstream side switching frequency calculating device for calculating the number of times NR of switching on the downstream side which switches from the rich side to the lean side or from the lean side to the rich side based on the downstream side rich/lean determination level which is set large by the downstream $O_2$ sensor 41 and the downstream side rich/lean determination level calculating device, the intake air volume calculating device for calculating the intake air volume into the internal combustion engine, the frequency ratio calculating device for calculating the frequency ratio NR/NF from the numbers of times of switching on the upstream and downstream sides in the event that the intake air volume is equal to or lager than the predetermined lower limit value and is equal to or smaller than the predetermined upper limit value, the mean value calculating device for calculating the mean value Fave from the frequency ratio NR/NF, and the deterioration determination device for determining the deterioration of the three-way catalyst 39 in the event that the mean value Fave of the frequency ratio is larger than the deterioration determination predetermined value.

Figure 8:
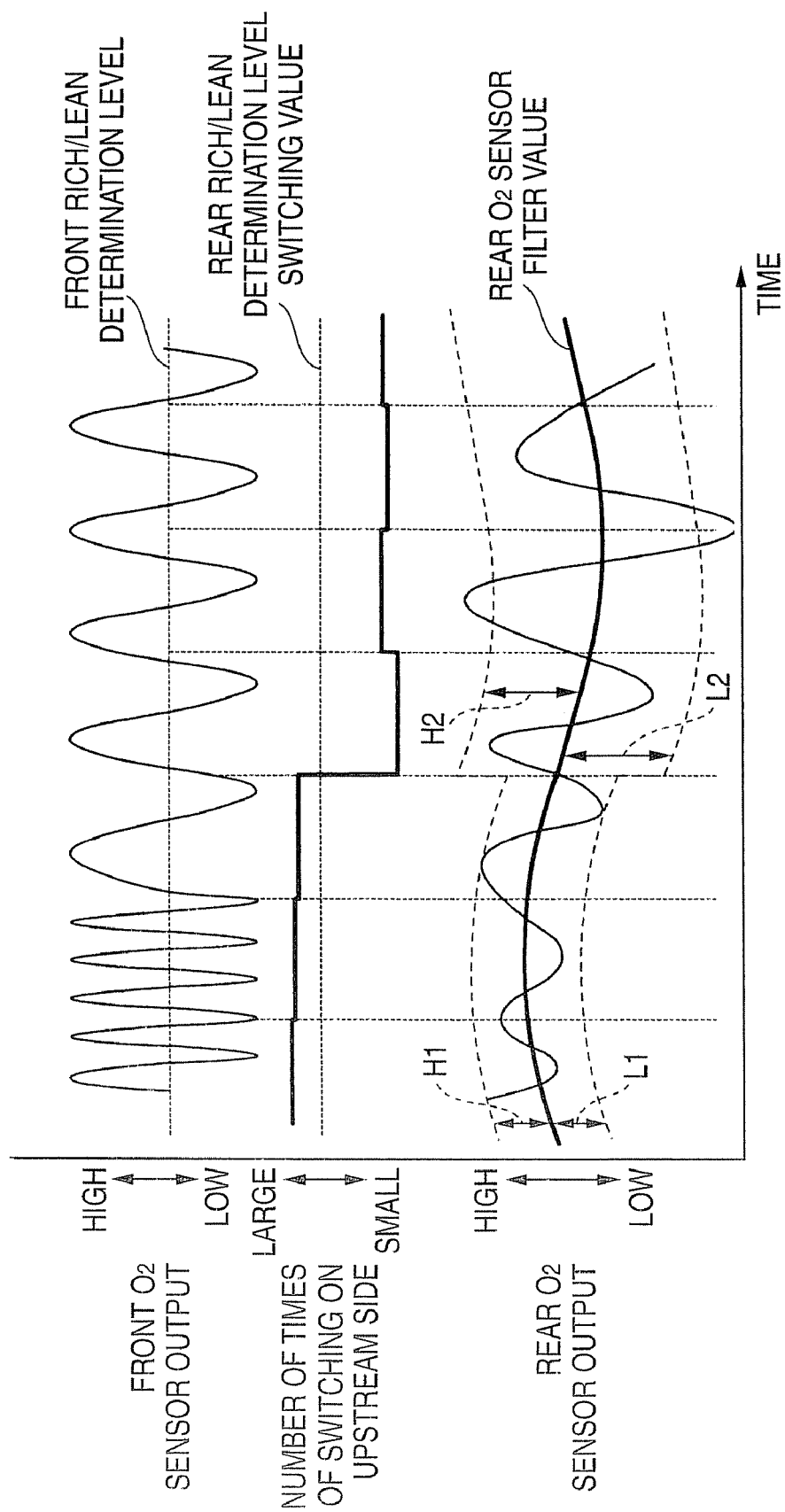
FIG. 8 is a time chart of the deterioration diagnostic system according to the embodiment of the invention.
Figure 9:
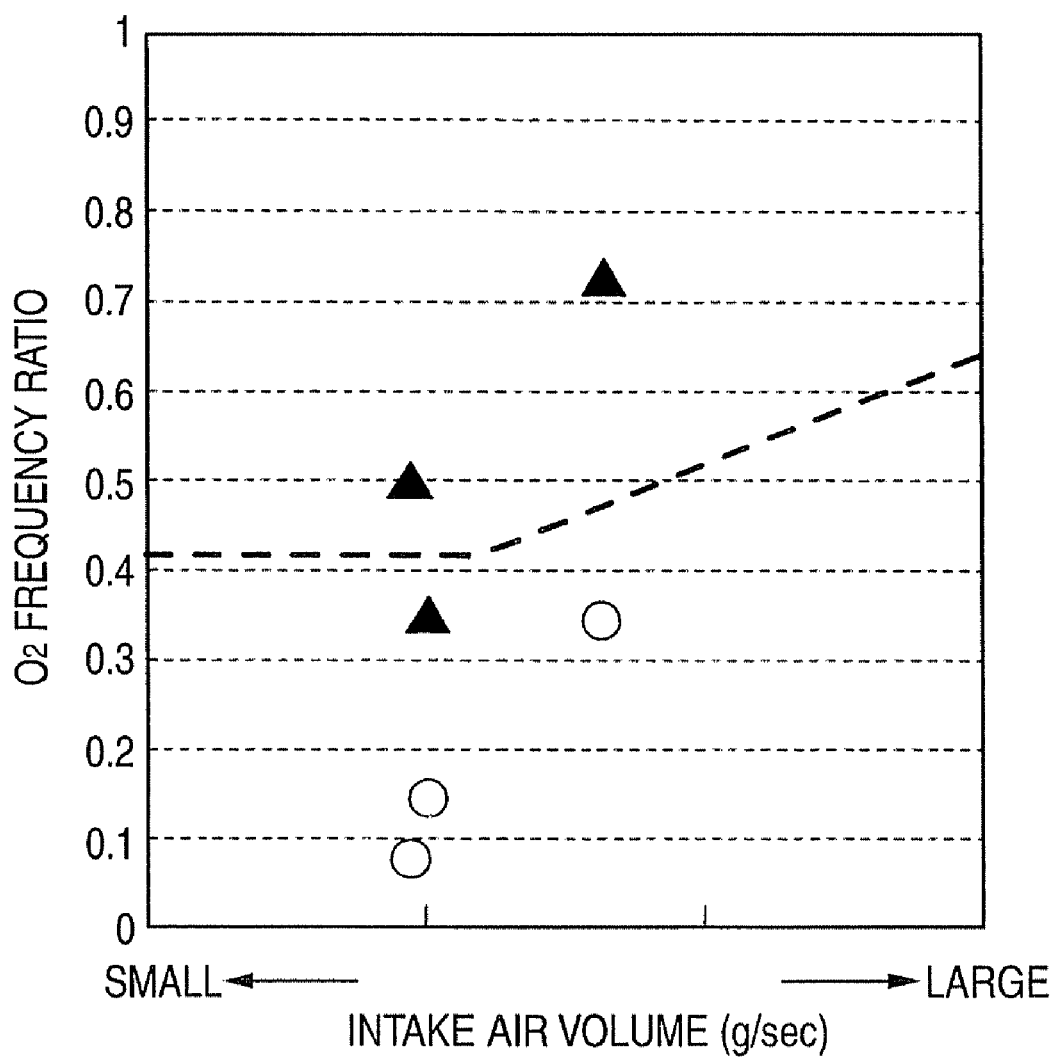
FIG. 9 is a graph showing an example of an $O_2$ frequency ratio which results when a catalyst is normal while the $FrO_2$ (upstream $O_2$ sensor) is deteriorating.

In the deterioration diagnostic system of the exhaust gas purifying catalyst, which operates in the way that has been described heretofore, for example, as is shown in FIG. 8, the downstream side rich/lean determination level is adjusted at two states (in a step-like fashion) according to a frequency of the output signal $FrO_2$ from the upstream $O_2$ sensor 40. The calculation load of the system itself can be reduced by switching the downstream side rich/lean determination level in the step-like fashion in the way described above.

Consequently, according to the deterioration diagnostic system of the exhaust gas purifying catalyst according to the embodiment of the invention, since the downstream side rich/lean determination level is configured to be switched to a larger value in the event that the number of times NF of switching on the upstream side lowers below the predetermined value, as is shown in FIG. 9, the erroneous determination of the deterioration of the three-way catalyst 39 due to the deterioration of the upstream $O_2$ sensor 40 can be prevented, thereby making it possible to determine the deterioration of the relevant catalyst 39 can be determined with high accuracy.

Due to the deterioration determination value F2 which determines the deterioration of the three-way catalyst 39 being configured to change according to the intake air volume, the erroneous determination of the deterioration of the three-way catalyst 39 due to the deterioration of the upstream $O_2$ sensor 40 can be prevented further, thereby making it possible to determine the deterioration of the relevant catalyst 39 can be determined with high accuracy.

Furthermore, in the event that the upstream side switching frequency or the number of times of switching on the upstream side for determination of switching of the downstream side rich/lean determination level hysteresis constant is configured to increase as the intake air volume increases, the deterioration of the upstream $O_2$ sensor 40 can be determined more appropriately, whereby the erroneous determination of the deterioration of the three-way catalyst 39 due to the deterioration of the upstream $O_2$ sensor 40 can be prevented much further, thereby making it possible to determine the deterioration of the relevant catalyst 39 can be determined with high accuracy.

This patent application claims the benefit of the Japanese Patent Publication No. 2006-129813 filed on May 9, 2006 in Japan and the contents of the relevant patent application are all deemed to be incorporated herein by reference thereto.

What is claimed is:

1. A deterioration diagnostic system of an exhaust gas purifying catalyst provided in an exhaust passageway of an internal combustion engine, which is operable to diagnose deterioration of the exhaust gas purifying catalyst based on output signals of upstream and downstream air-fuel ratio sensors which are provided on an upstream side and a downstream side of the exhaust gas purifying catalyst, the deterioration diagnostic system comprising:

an upstream side switching frequency calculator, operable to calculate the number of times of switching on the upstream side from a rich side to a lean side or from the lean side to the rich side based on the output signals of the upstream air-fuel ratio sensor and an upstream side rich/lean determination level;

a reference value calculator, operable to calculate a downstream side rich/lean determination level having a first width which is used for performing a downstream side rich/lean determination;

a downstream side rich/lean determination level adjuster, operable to set the first width of the downstream side rich/lean determination level to a second width that is larger than the first width when the number of times of switching on the upstream side is smaller than a first predetermined value;

a downstream side switching frequency calculator, operable to calculate the number of times of switching on the downstream side from the rich side to the lean side or from the lean side to the rich side based on the output signals of the downstream side air-fuel ratio sensor and the downstream side rich/lean determination level having the second width;

an intake air volume calculator, operable to calculate an intake air volume into the internal combustion engine;

a frequency ratio calculator, operable to calculate a frequency ratio that is a ratio between the number of times of switching on the downstream side and the number of times of switching on the upstream side when the intake air volume is no less than a predetermined lower limit value and is no more than a predetermined upper limit value; and a deterioration determiner, operable to determine the deterioration of the exhaust gas purifying catalyst when the frequency ratio is larger than a second predetermined value.

2. The deterioration diagnostic system according to claim 1, wherein
the second predetermined value increases as the intake air volume increases which is calculated by the intake air volume calculator.

3. The deterioration diagnostic system according to claim 1, wherein
the first predetermined value is set to decrease as the intake air volume decreases which is calculated by the intake air volume calculator.

4. The deterioration diagnostic system according to claim 1, wherein
the downstream side rich/lean determination level is configured as a step.

5. The deterioration diagnostic system according to claim 1, wherein
the reference value calculator calculates a downstream side rich/lean determination level reference value which is obtained by averaging the output signals of the downstream side air-fuel ratio sensor.

6. A deterioration diagnostic system of an exhaust gas purifying catalyst provided in an exhaust passageway of an internal combustion engine, which is operable to diagnose deterioration of the exhaust gas purifying catalyst based on output signals of upstream and downstream air-fuel ratio sensors which are provided on an upstream side and a downstream side of the exhaust gas purifying catalyst, the deterioration diagnostic system comprising:

an upstream side switching frequency calculator, operable to calculate the number of times of switching on the upstream side from a rich side to a lean side or from the lean side to the rich side based on the output signals of the upstream air-fuel ratio sensor and an upstream side rich/lean determination level;

a reference value calculator, operable to calculate a downstream side rich/lean determination level having a first width which is used for performing a downstream side rich/lean determination;

a downstream side rich/lean determination level adjuster, operable to set the first width of the downstream side rich/lean determination level to a second width that is larger than the first width when the number of times of switching on the upstream side is smaller than a predetermined value;

a downstream side switching frequency calculator, operable to calculate the number of times of switching on the downstream side from the rich side to the lean side or from the lean side to the rich side based on the output signals of the downstream side air-fuel ratio sensor and the downstream side rich/lean determination level having the second width; and a deterioration determiner, operable to determine the deterioration of the exhaust gas purifying catalyst based on the number of times of switching on the downstream side and the number of times of switching on the upstream side.

7. A method for diagnosing deterioration of an exhaust gas purifying catalyst provided in an exhaust passageway of an internal combustion engine based on output signals of upstream and downstream air-fuel ratio sensors which are provided on an upstream side and a downstream side of the exhaust gas purifying catalyst, comprising:

calculating the number of times of switching on the upstream side from a rich side to a lean side or from the lean side to the rich side based on the output signals of the upstream air-fuel ratio sensor and an upstream side rich/lean determination level;

calculating a downstream side rich/lean determination level having a first width which is used for performing a downstream side rich/lean determination;

setting the first width of the downstream side rich/lean determination level to a second width that is larger than the first width when the number of times of switching on the upstream side is smaller than a first predetermined value;

calculating the number of times of switching on the downstream side from the rich side to the lean side or from the lean side to the rich side based on the output signals of the downstream side air-fuel ratio sensor and the downstream side rich/lean determination level having the second width;

calculating an intake air volume into the internal combustion engine;

calculating a frequency ratio that is a ratio between the number of times of switching on the downstream side and the number of times of switching on the upstream side when the intake air volume is no less than a predetermined lower limit value and is no more than a predetermined upper limit value; and determining the deterioration of the exhaust gas purifying catalyst when the frequency ratio is larger than a second predetermined value.

* * * * *